United States Patent
Shimizu et al.

(10) Patent No.: US 7,456,906 B2
(45) Date of Patent: Nov. 25, 2008

(54) POWER STATUS DETECTION AND PROCESSING OF AUDIO/VIDEO (A/V) DEVICES IN A/V NETWORKS

(75) Inventors: Tetsuya Shimizu, Irvine, CA (US); Atul Batra, Lake Forest, CA (US); Wang He Lou, Tustin, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 991 days.

(21) Appl. No.: 10/759,577

(22) Filed: Jan. 16, 2004

(65) Prior Publication Data

US 2005/0157216 A1    Jul. 21, 2005

(51) Int. Cl.
H04N 5/63 (2006.01)
H04N 5/268 (2006.01)

(52) U.S. Cl. .................... 348/730; 348/706
(58) Field of Classification Search ........... 348/730, 348/552, 725, 706; 725/133, 141, 153; 361/93.1; H04N 5/44, 5/63, 5/268
See application file for complete search history.

(56) References Cited

U.S. PATENT DOCUMENTS

| | | | |
|---|---|---|---|
| 4,439,784 A | * | 3/1984 | Furukawa et al. ........... 348/730 |
| 4,579,338 A | * | 4/1986 | Heffron ........................ 348/730 |
| 4,903,130 A | * | 2/1990 | Kitagawa et al. ............ 348/730 |
| 5,231,310 A | * | 7/1993 | Oh .............................. 348/725 |

* cited by examiner

Primary Examiner—Sherrie Hsia
(74) Attorney, Agent, or Firm—Orrick, Herrington & Sutcliffe LLP

(57) ABSTRACT

Systems and methods are provided that facilitate detection and processing of A/V device power status in A/V networks. Preferably, a power detection system includes a current sensor coupled to the power cord of an A/V device, a current-to-voltage converter coupled to the sensor, a voltage comparator coupled to the converter, a reference voltage output circuit coupled to the comparator, and a micro-controller coupled to the comparator and the reference voltage output circuit. In operation, the current being drawn by the A/V device through its power cord is detected and converted to an input voltage, which is then compared to a device specific threshold voltage. If the input voltage is not greater than the threshold voltage, a "Power On" command is sent to the A/V device and the detection, conversion and comparison process is repeated. If the input voltage is greater than the threshold voltage, desired commands and/or instructions are sent to the A/V device.

21 Claims, 4 Drawing Sheets

POWER STATUS DETECTION AND PROCESSING OF AUDIO/VIDEO (A/V) DEVICES IN A/V NETWORKS

FIELD OF THE INVENTION

The invention relates generally to audio/video (A/V) network systems and more particularly to systems and methods that facilitate power status detection and processing of AV devices in A/V networks.

BACKGROUND INFORMATION

Audio/video (AV) network systems, including those for the home, continue to become more elaborate in quantity and variety of devices connected to the system. For instance, an A/V network may include a digital television (DTV) or some other primary video display unit (PDU) with a variety of different A/V devices such as A/V receivers, DVD players, VCRs and the like connected thereto. The A/V devices are often both analog and digital, and, if digital, often IEEE 1394 compatible. Until recently, most control systems, including those based on IEEE 1394 technology in which the DTV or PDU can be engineered to be the command center of the network system, provided no way to centrally control both the digital and the conventionally wired, IR signal controlled, analog A/V devices of the system. As a result, the interconnection and control of such systems remained complex and unwieldy. For example, simply switching from a cable broadcast to playing a movie on a DVD player often involved numerous device specific remote controls and several iterations through the different layers of control on such remotes.

Recent developments, however, have yielded control systems that centrally control a network of A/V and other electronic devices over a variety of protocols such as analog, digital and IEEE 1394. See, e.g., U.S. Published patent application No. US-2002-0171624-A1, entitled "Control System And User Interface For Network Of Input Devices." Although highly successful in centrally controlling the different A/V and electronic devices connected to the system, this and other control systems often run into difficulties when trying to control the conventionally wired, IR signal controlled, analog devices. More particularly, because these control systems are unable to detect the power status of these analog devices, it is difficult for these control systems to effectively and efficiently control the analog devices.

Accordingly, it would be desirable to provide a system and method by which the power status of analog A/V devices can be determined.

SUMMARY

The present invention is directed to systems and methods that facilitate detection and processing of A/V device power status in A/V networks. In a preferred embodiment, a power detection system of the present invention includes a current sensor coupled to the power cord of an A/V device, a current-to-voltage converter coupled to the sensor, a voltage comparator coupled to the converter, a reference voltage output circuit coupled to the comparator, and a micro-controller coupled to the comparator and the reference voltage output circuit, and also to the A/V devices.

In operation, the micro-controller identifies the A/V device that is to be controlled or instructed to perform some function such as play a DVD disc. Once identified, the current sensor coupled to the A/V device's power cord detects the AC power current being drawn by the A/V device through the cord. The current level is then converted to an input voltage signal by the voltage converted. The micro-controller retrieves from memory the threshold voltage for the particular A/V device and causes the reference voltage generation circuit to generate the appropriate threshold voltage. The comparator then compares the input voltage to the threshold voltage for the A/V device. If the input voltage is not greater than the threshold voltage, the micro-controller sends the A/V device a "Power On" command to turn the A/V device on so it can receive and act in accordance with other commands or instructions. After sending the "Power On" command, the steps of detecting current, converting current to an input voltage, retrieving and generating a threshold voltage, and comparing the input voltage to the threshold voltage are all repeated. If the input voltage is determined to be greater than the threshold voltage and, the A/V device is determined to be ON, the micro-controller then sends the desired commands and/or instructions to the A/V device.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

The systems and methods described herein provide detection and processing of the power status of A/V devices in an A/V network. More particularly, the system and methods of the present invention preferably senses the AC power current level being drawn through the power cord of the A/V devices to determine their power status and then, if necessary, sends the appropriate command to turn the A/V devices on prior to sending other control commands to the A/V devices.

Figure 1:
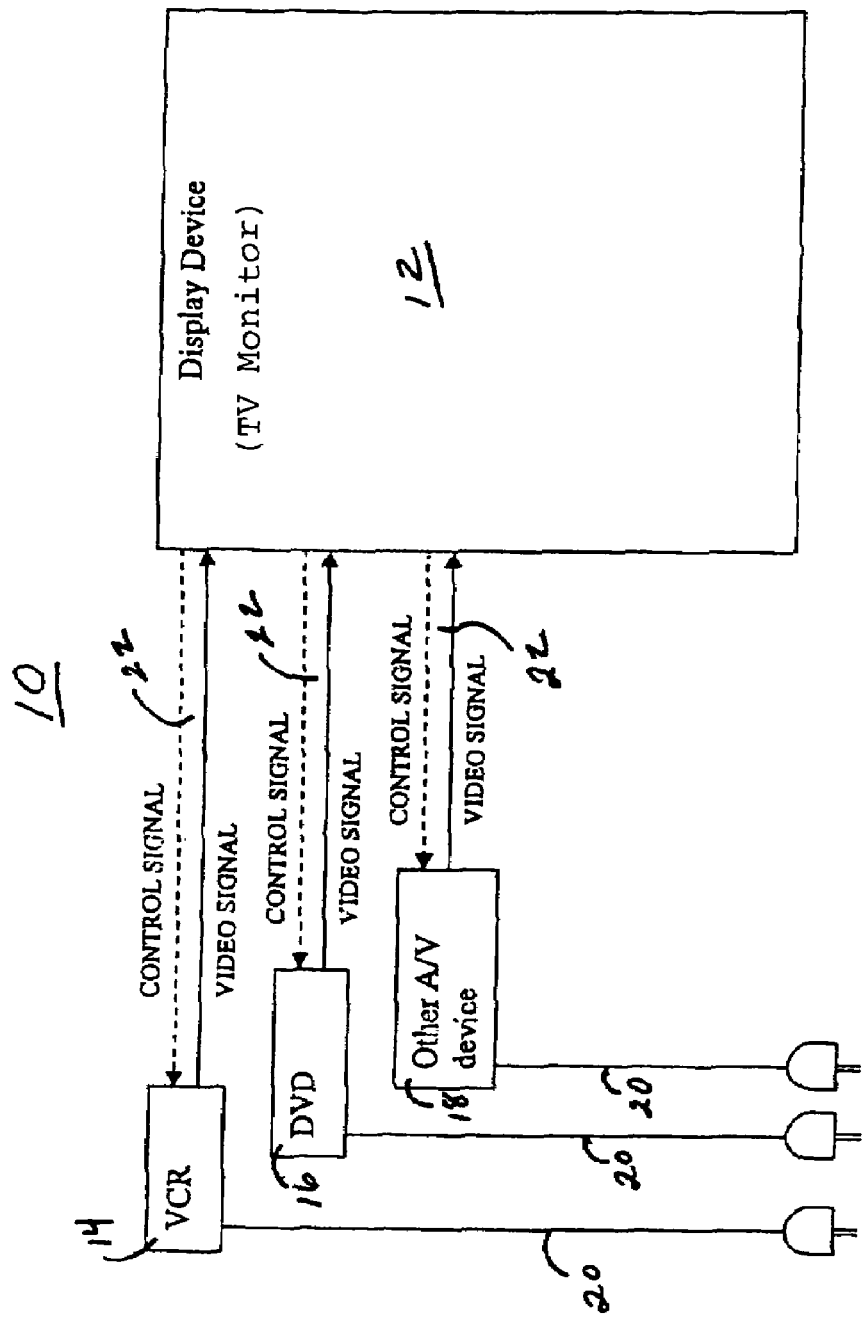
FIG. 1 depicts a schematic of an A/V network in accordance with the prior art.

Referring to FIG. 1, a typical or conventional A/V network 10 is depicted to include a display device 12 such as a TV or the like coupled to a VCR 14, a DVD 16, and other A/V devices 18 via control and A/V signal transmission lines or cables 22. Each of the A/V devices 14, 16 and 18 includes an AC power line or cord 20. The display device 12 may include a micro-controller configured to control each of the A/V devices 14, 16 and 18. However, if the A/V devices 14, 16 and 18 are analog devices, the micro-controller will likely not be able to determine the power status of the analog A/V devices and, as a result, have difficulty controlling the analog A/V devices.

Figure 2:
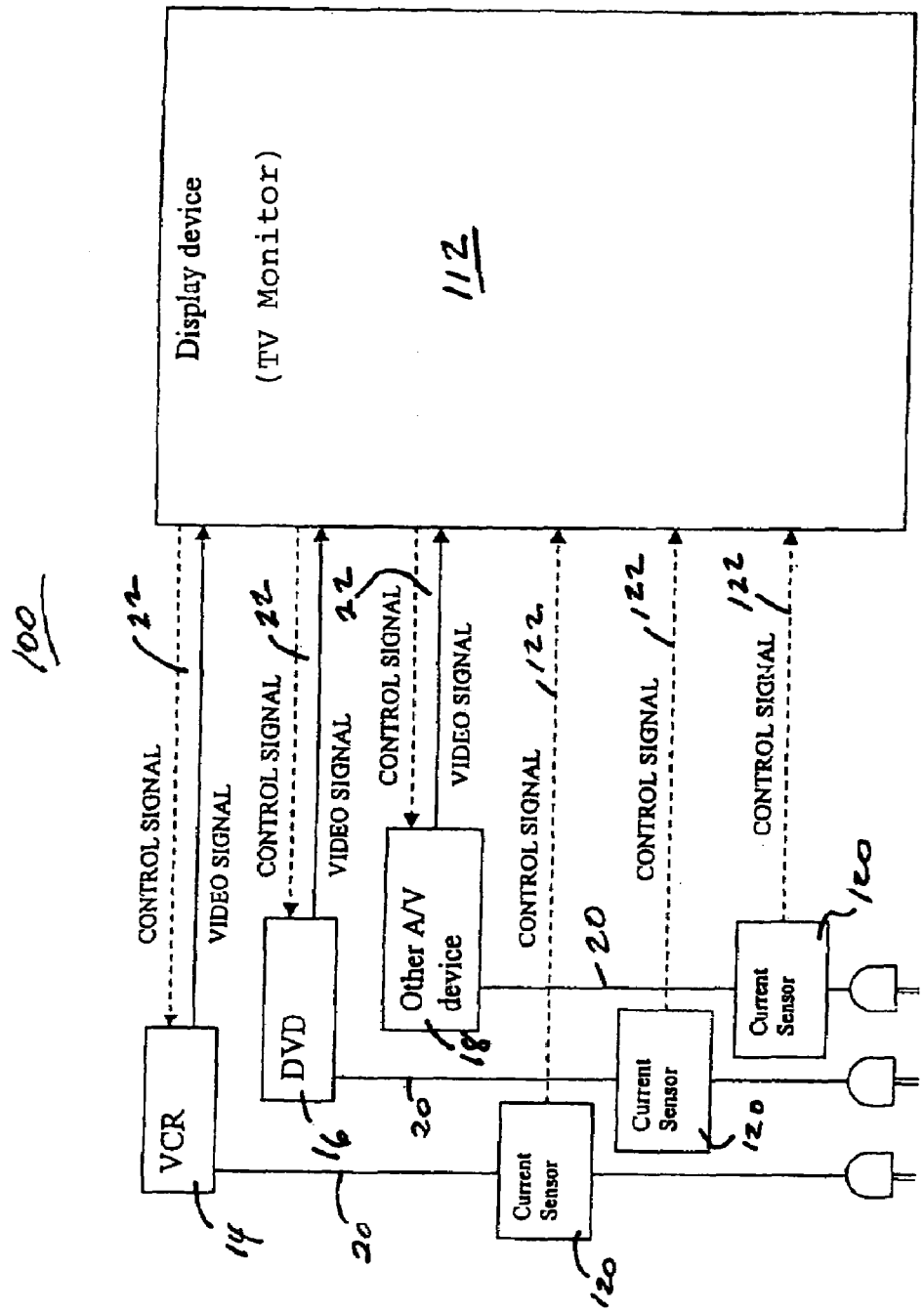
FIG. 2 depicts a schematic of an A/V network in accordance with the present invention.
Figure 3:
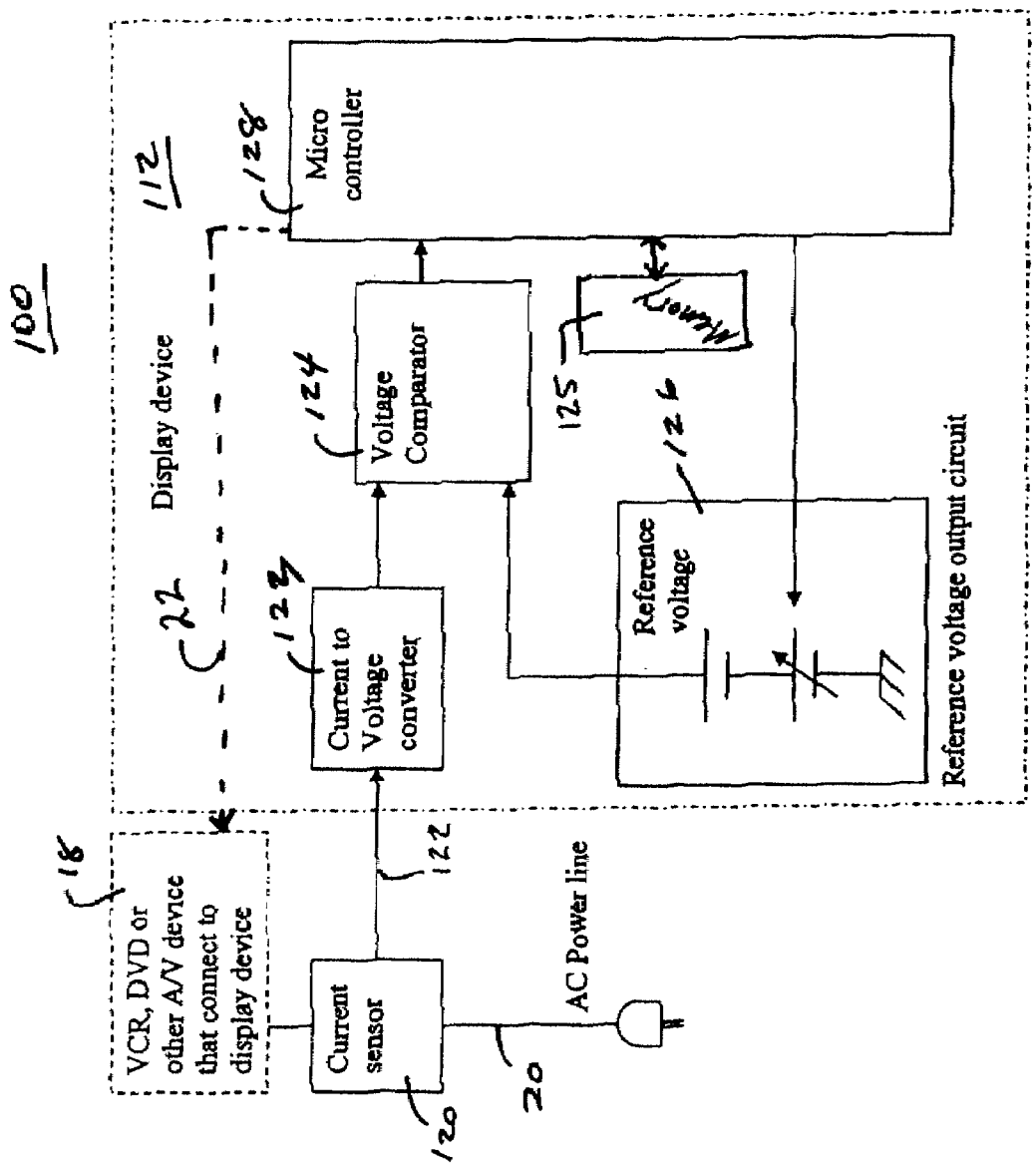
FIG. 3 depicts a schematic showing control system details of the A/V network shown in FIG. 2.
Figure 4:
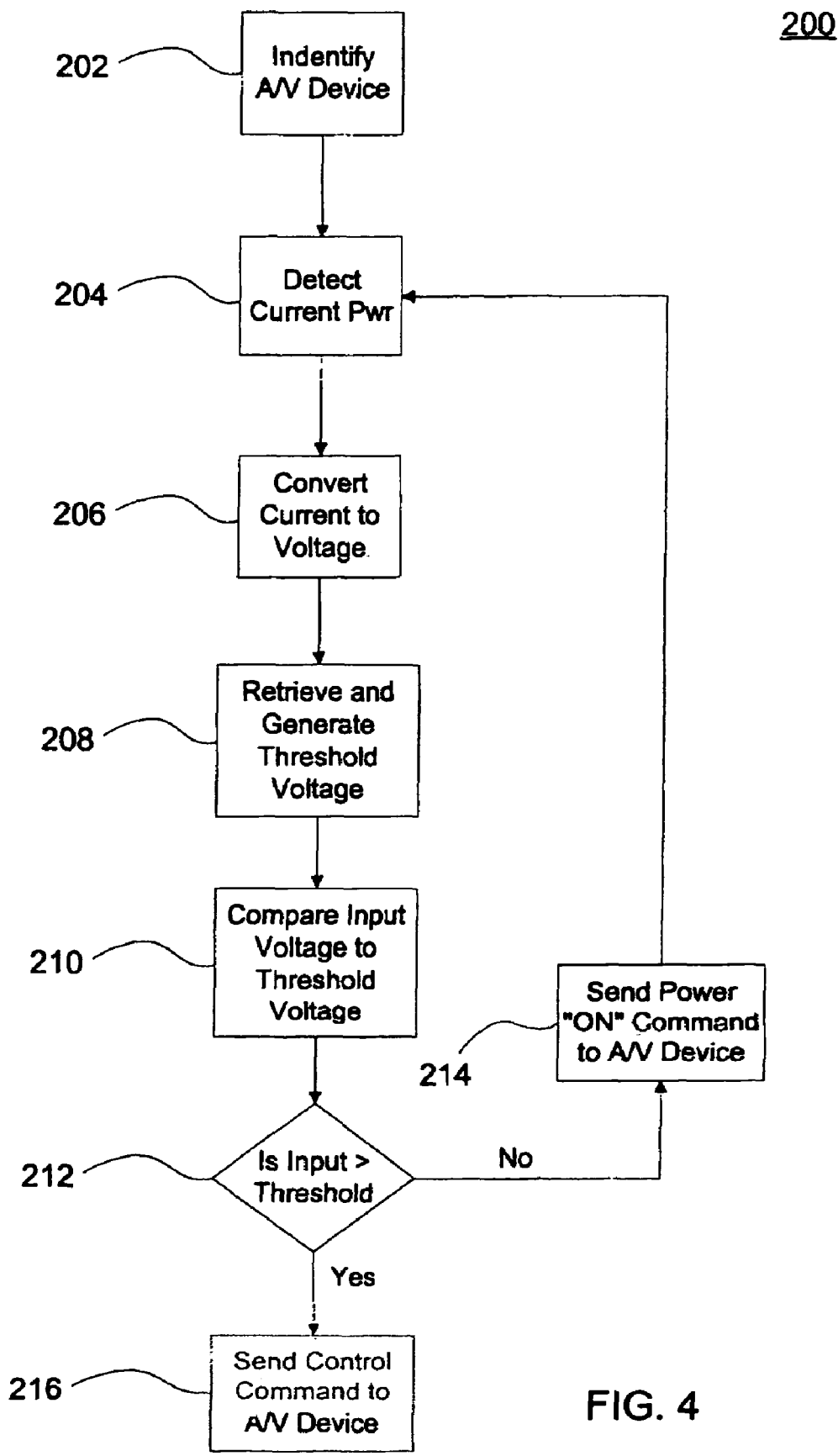
FIG. 4 depicts a flow chart illustrating a control process in accordance with the present invention.

Referring in detail to FIGS. 2, 3 and 4, a power detection system 100 and method 200 in accordance with the present invention are depicted. Like the conventional system 10, a preferred embodiment of the power detection system 100 of the present invention preferably includes a display device 112 such as a TV coupled to a VCR 14, a DVD 16, and other A/V devices 18, and, in the alternative, other electronic devices (not shown) as well, via control and A/V signal transmission lines or cables 22. Alternatively, the display device 112 may be wirelessly coupled to the A/V devices 14, 16 and 18. Each of the A/V devices 14, 16 and 18 includes an AC power line or cord 20. As shown in FIGS. 2 and 3, the power detection system 100 of the present invention preferably includes individual current sensors 120 each coupled to the individual power cords or lines 20 of the A/V devices. Alternatively, one or more current sensors 120 may be coupled to one or more of the power cords 20 of the A/V devices. The display device 112 preferably includes a current to voltage converter 123 coupled to the current sensor 120 via control signal transmission line 122, a voltage comparator 124 coupled to the converter 123, a variable voltage supply such as reference voltage output circuit 126 coupled to the comparator 124, and a micro-controller 128, such as a TV's microprocessor or the like, coupled to the comparator 124 and the reference voltage output circuit 126. The micro-controller 128 is also coupled along control signal transmission lines 22 to the A/V devices. The current sensor 120 senses or detects the level of current passing through the AC power line 22 of the A/V device 18. The converter 123 converts the current level to a voltage signal that is inputted into the comparator 124. The comparator 124 compares the measured input voltage to an internally generated reference voltage, i.e., a threshold voltage. The threshold voltage is device specific and can be stored in memory 125 in the display device (112) when the device is connected to the system and identified for the micro-controller 128. (See U.S. Published application Ser. No. US-2002-0171624-A1, CONTROL SYSTEM AND USER INTERFACE FOR NETWORK OF INPUT DEVICES, Ser. No. 10/138,702 filed May 2, 2003, which is incorporated herein by reference). The threshold voltage for every network device will be stored, through a couple of steps and with the help of the user. During the first set up, the user will be asked to connect the device 18 to display device 12 and turn it ON. The user will be asked to adjust an on-screen slider bar on the screen, which in turn will trigger micro-controller 128 to change the reference voltage 126 internally, to match with the voltage that is being generate by current to voltage converter 123. Once this internal reference voltage 126 becomes equal to this generated voltage 123, it is memorized as a threshold voltage for that specific device and on screen slider will also become green, to indicate that this threshold voltage has been memorized. The voltage output circuit 126 generates the reference voltage based on the stored threshold voltage information. The micro-controller 128, which is preferably adapted to centrally control the A/V devices 18, instructs the voltage output circuit 126 as to what reference voltage to generate and send appropriate control signals to the A/V devices 18 based on the feedback information it receives from the comparator 124.

In accordance with the power status detection and processing method 200 of the present invention, the micro-controller 128, at step 202, identifies the A/V device that is to be controlled or instructed to perform some function such as play a DVD disc. Once identified, the current sensor 120, at step 204, detects the AC power current level being drawn by the device 18 through its power cord 20. At step 206, the current level is then converted to an input voltage signal by the voltage converter 124. The micro-controller 128, at step 208, retrieves from memory 125 the threshold voltage for the particular A/V device and causes the reference voltage generation circuit 126 to generate the appropriate threshold voltage. The comparator 124, at step 210, then compares the input voltage to the threshold voltage for the particular A/V device 18. If, at step 212, it is determined that the input voltage is not greater than the threshold voltage, the micro-controller 128, at step 214, sends the A/V device 18 a "Power On" command to turn the A/V device 18 "ON" so it can receive and act in accordance with other commands or instructions sent by the micro-controller 128. After sending the "Power On" command, steps 204 through 212 for detecting current, converting current to an input voltage, retrieving and generating a threshold voltage, and comparing the input voltage to the threshold voltage are all repeated. If the input voltage is determined, at step 212, to be greater than the threshold voltage and, the A/V device 18 is determined to be ON and the micro-controller 128 then sends, at step 216, the desired commands and/or instructions to the A/V device 18.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. An electronic device network comprising
an electronic device having a power cord,
a display unit, and
a power detection and control system coupled to the power cord of the electronic device, wherein the power detection and control system is housed in part within the display unit and further comprises a current sensor coupled to the power cord and a current-to-voltage converter coupled to the sensor.

2. The network of claim 1 wherein the power detection and control system comprises a voltage comparator coupled to the converter.

3. The network of claim 2 wherein the power detection and control system comprises a reference voltage output circuit coupled to the comparator.

4. The network of claim 3 wherein the power detection and control system comprises a micro-controller coupled to the comparator and the reference voltage output circuit.

5. The network of claim 4 wherein the electronic device is an A/V device.

6. The network of claim 4 wherein the electronic device is an analog device.

7. An electronic device network comprising
a controller housed within a display unit,
an electronic device coupled to the controller,
a current sensor coupled to the controller and to the electronic device, wherein the sensor is coupled to the power cord of the electronic device, and
a current-to-voltage converter coupled to the sensor.

8. The network of claim 7 further comprising a voltage comparator coupled to the converter.

9. The network of claim 8 further comprising a reference voltage output circuit coupled to the comparator wherein the controller is coupled to the comparator and the reference voltage output circuit.

10. The network of claim 7 wherein the electronic device is an A/V device.

11. The network of claim 7 wherein the electronic device is an analog device.

12. An A/V device network comprising
a display unit,
a plurality of A/V devices coupled to the display unit,
a micro-controller coupled to the A/V devices,
one or more current sensors coupled to the A/V devices,
a current to voltage converter coupled to the one or more current sensors and to the micro-controller,
a reference voltage generator coupled to the converter and the micro-controller, and
a voltage comparator coupled to the voltage generator, micro-controller and converter.

13. The network of claim 12 wherein the display unit is a TV.

14. The network of claim 12 wherein the A/V devices are analog devices.

15. A method comprising the steps of
identifying an electronic device to be controlled,
detecting the current being drawn by the device through its power cord,
converting the current level to an input voltage, and
comparing the input voltage to the threshold voltage to determine whether the input voltage is less than or greater than the threshold voltage.

16. The method of claim 15 further comprising the step of generating a threshold voltage corresponding to the device.

17. The method of claim 16 further comprising the step of storing the threshold voltage for each device in memory.

18. The method of claim 17 further comprising the step of retrieving the threshold voltage from memory.

19. The method of claim 15 further comprising the step of sending a power on command to the device if the input voltage is less than the threshold voltage.

20. The method of claim 19 further comprising the step of repeating the steps of claim 15.

21. The method of claim 15 further comprising the step of sending a non-power on control command to the device if the input voltage is greater than the threshold voltage.

* * * * *